United States Patent
Vogliano et al.

(10) Patent No.: US 6,821,111 B2
(45) Date of Patent: Nov. 23, 2004

(54) LATTICE GATE FOR DROP GATE INJECTION MOLDING

(75) Inventors: Robert Henry Vogliano, Tallmadge, OH (US); Mark Russell Miller, New Bremen, OH (US); John Richard White, Wadsworth, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/449,551

(22) Filed: May 30, 2003

(65) Prior Publication Data

US 2003/0206992 A1 Nov. 6, 2003

Related U.S. Application Data

(60) Division of application No. 09/658,087, filed on Sep. 8, 2000, now Pat. No. 6,607,688, which is a continuation-in-part of application No. 09/445,522, filed as application No. PCT/US97/09916 on Jun. 9, 1997, now Pat. No. 6,379,603.

(51) Int. Cl.$^7$ .............................................. B29C 45/20
(52) U.S. Cl. ................ 425/543; 264/328.6; 264/328.8; 425/572
(58) Field of Search ........................... 264/328.6, 328.8, 264/328.18; 425/543, 547, 572

(56) References Cited

U.S. PATENT DOCUMENTS

| 2,426,651 | A | | 9/1947 | Stacy | 264/328.4 |
|---|---|---|---|---|---|
| 4,097,928 | A | | 6/1978 | Fries | 366/336 |
| 4,199,315 | A | | 4/1980 | Gallizia et al. | 425/572 |
| 4,790,992 | A | * | 12/1988 | Nishikawa | 425/206 |
| 5,804,231 | A | | 9/1998 | Prophet et al. | 425/570 |
| 6,077,470 | A | | 6/2000 | Beaumont | 264/297.2 |
| 6,379,603 | B1 | | 4/2002 | White et al. | 264/328.12 |
| 6,387,313 | B1 | | 5/2002 | Chang et al. | 264/328.12 |

FOREIGN PATENT DOCUMENTS

| WO | 9856559 | 12/1998 | B29C/45/27 |
|---|---|---|---|

* cited by examiner

Primary Examiner—Tim Heitbrink
(74) Attorney, Agent, or Firm—Nancy T. Krawczyk

(57) ABSTRACT

The present invention is directed towards the hybrid combination of a drop gate injection molding system and a lattice gate. The lattice gate is located prior to the orifice of the drop gate. The lattice gate is comprised of a series of cross-direction flow channels through which the rubber flows, with mixing of the rubbers at the intersections of the flow channels. This hybrid molding system permits shorter cure times, and improved process cycle time for curing rubbers.

5 Claims, 9 Drawing Sheets

US 6,821,111 B2

1

LATTICE GATE FOR DROP GATE INJECTION MOLDING

This application is a Divisional of 09/658,087, filed Sep. 8, 2000, now U.S. Pat. No. 6,607,688, issued Aug. 19, 2003, which is a Continuation-in-Part of U.S. patent application Ser. No. 09/445,522, having a §102(e) date of Dec. 7, 1999, now U.S. Pat. No. 6,379,603, issued on Apr. 30, 2002, which was based upon PCT application PCT/US97/09916, filed Jun. 9, 1997.

FIELD OF THE INVENTION

The present invention relates to an improved gate design for drop gate injection molding of rubber compounds to form rubber articles. More particularly, the present invention relates to the unexpected combination of a drop gate with a lattice gate for increased gate heating efficiency and reduced cycle time while the rubber part is being injection molded.

BACKGROUND OF THE INVENTION

In a typical elastomer injection molding process, uncured viscous elastomeric compound is introduced into an elongated barrel of an injection molding machine at ambient temperatures. The compound is advanced through the barrel towards a mold connected to the downstream end of the barrel, usually by either a rotating screw conveyor or a reciprocating ram or piston disposed in the barrel. As the elastomeric compound advances, it is heated by heat conduction and mechanical shear heating in the barrel to reduce its viscosity and render the elastomer more flowable and amenable to subsequent injection into the mold. Typically, the less viscous the compound, the more easily it flows through a conventional gate system and the more easily it fills a mold cavity to produce a satisfactorily molded object.

One type of conventional gate for injection molded products is a "drop gate" design. This type of gate is used when a side injection system is not feasible depending upon the mold design used for certain injection molded products. With a drop gate, the elastomer is forced through a small diameter orifice and into the molded part. The majority of the shear heating occurs at the orifice area of the gate. FIG. 10 is a schematic drawing of a drop gate design 100 used to mold an article. A sprue pad 102 feeds elastomer to drop gate runners 104. From the runners 104, the elastomer flows through the drop gate orifices 106, which have a smaller diameter than the drop gate runners 104, and fills the mold cavity 108.

WO 98/56559 discloses another gate design for injection molding rubber compounds. The gate design is a lattice gate. The lattice gate minimizes differences in temperature and pressure that result in a parabolic rubber flow through the gate. This is achieved by a series of crossed flow channels. WO 98/56559 teaches replacement of the conventional flat gate of the prior art with the inventive lattice gate.

SUMMARY OF THE INVENTION

The present invention is directed to an improved method and apparatus for a drop injection gate for molding rubber. The inventive method reduces curing time and improves the heat characteristics of the rubber as it is injected.

One aspect of the invention is an improved method of drop gate injection molding rubber. The method comprising injecting a rubber into a drop gate and through drop gate runners and into a mold cavity. The rubber flows at cross angles after the rubber is injected into the gate and before the rubber enters into the drop gate runners.

2

Another aspect of the invention is an improved drop injection gate for injection molding rubber into a mold cavity. The gate is comprised of drop gate runners. The gate has a region adjacent to the drop gate runners comprising a first and a second plurality of spaced flow channels disposed at intersecting angles to each other to create cross direction flow of the rubber before the rubber enters into the drop gate runners.

In another aspect of the invention, the drop injection gate has more than one separate region adjacent to drop gate runners comprising the first and second plurality of spaced flow channels disposed at intersecting angles to each other.

BRIEF DESCRIPTION OF THE DRAWINGS

The invention will be described by way of example and with reference to the accompanying drawings in which.

DETAILED DESCRIPTION OF THE PREFERRED EMBODIMENTS

Figure 1:
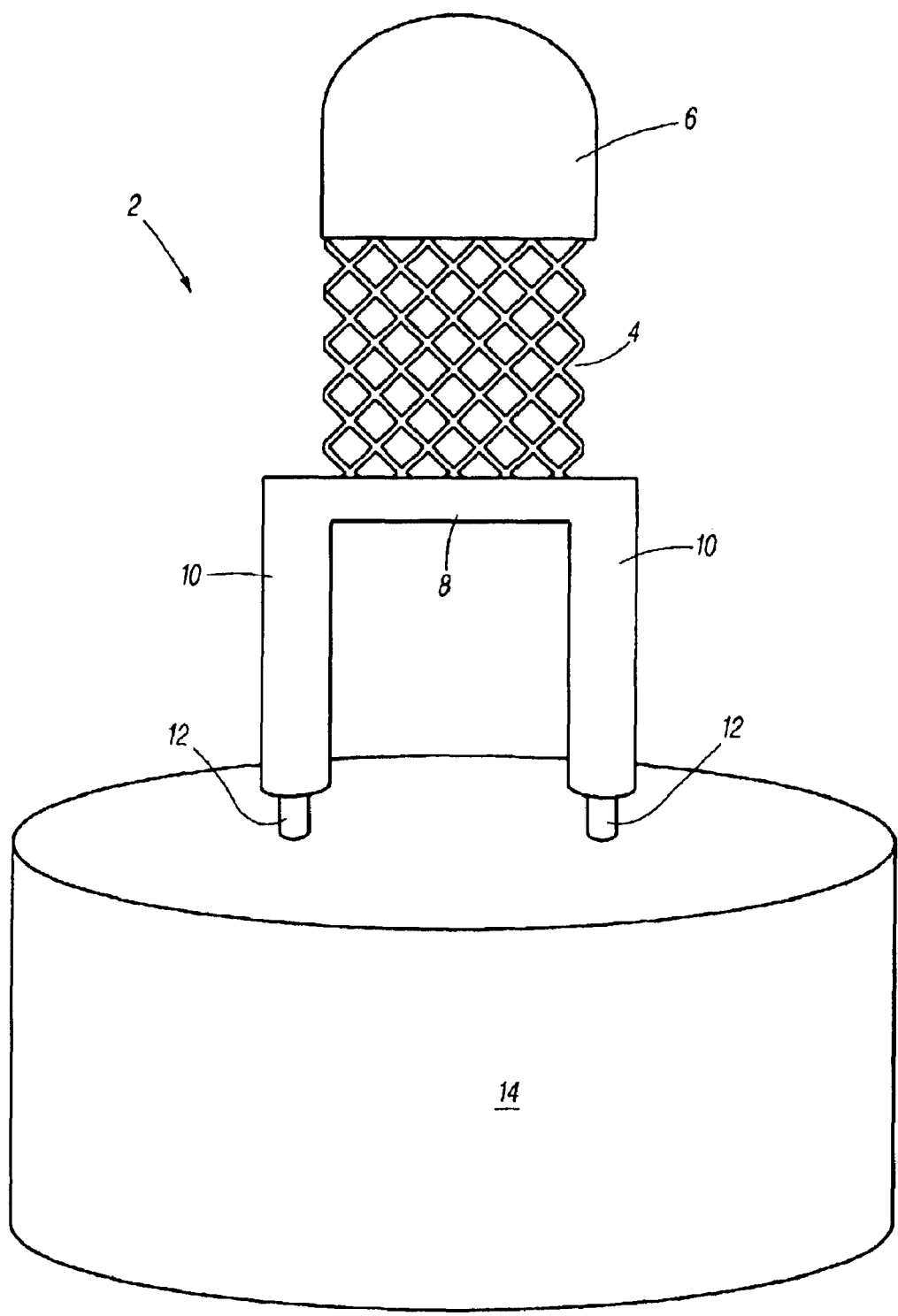
FIG. 1 is a schematic representation of the inventive hybrid gate system.

The present invention is related to the design of an improved gate system for improving mixing and temperature uniformity and decreasing mold times in a drop gate mold injection system. The improved gate system is the unexpected combination of a lattice gate and a drop gate. FIG. 1 is a schematic representation of the inventive hybrid gate system 2. The hybrid gate system 2 incorporates a lattice gate 4 after the sprue inlet 6. Elastomeric material flows into the hybrid gate 2 through the sprue inlet 6, and then flows through the lattice gate 4. An outlet distribution channel 8 from the lattice gate 4 feeds the elastomer from the lattice gate 4 to the drop gate runners 10. From the runners 10, the elastomer flows through the drop gate orifices 12 and fills the mold cavity 14.

Figure 2:
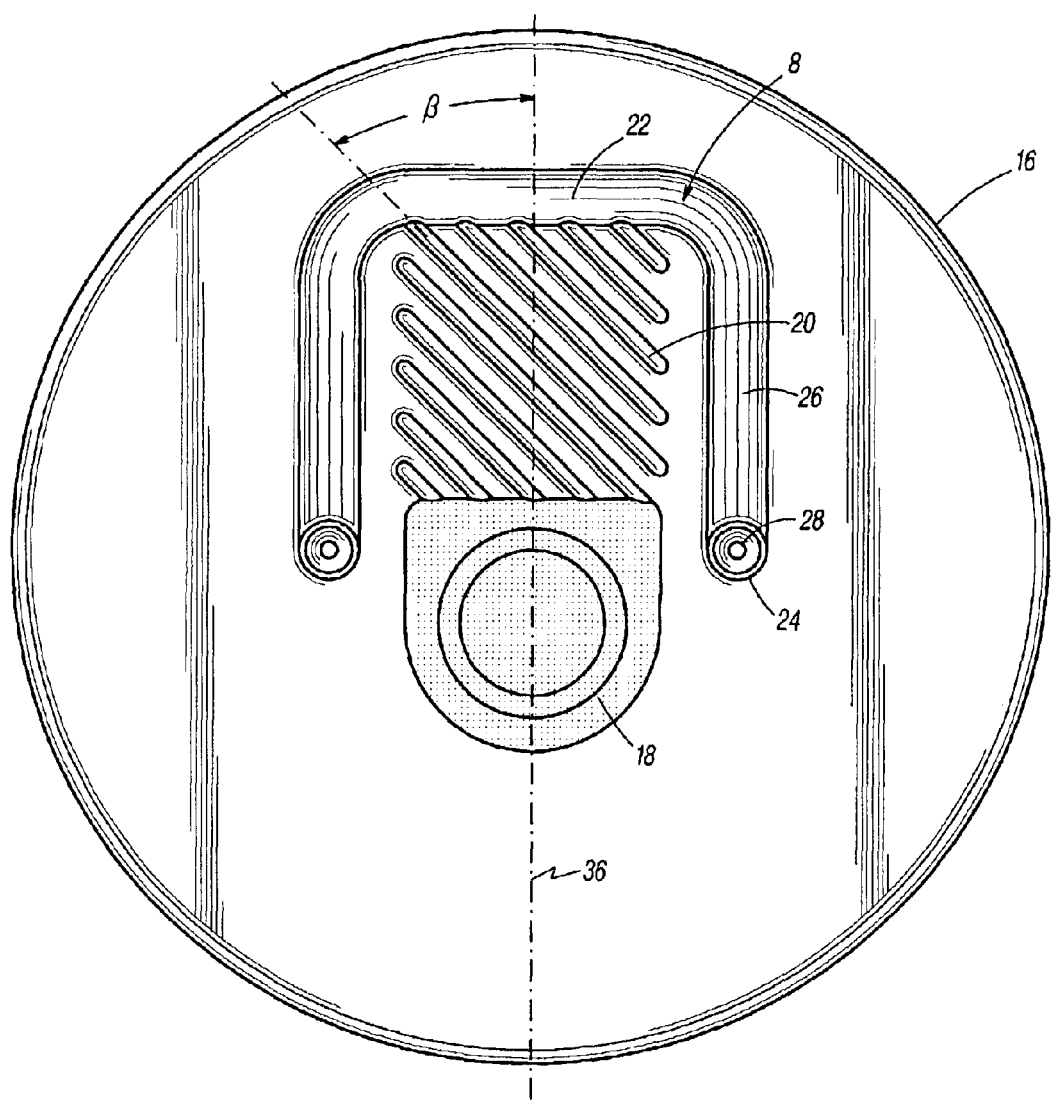
FIG. 2 is an overhead view of the bottom plate of the lattice portion of the hybrid gate system.
Figure 3:
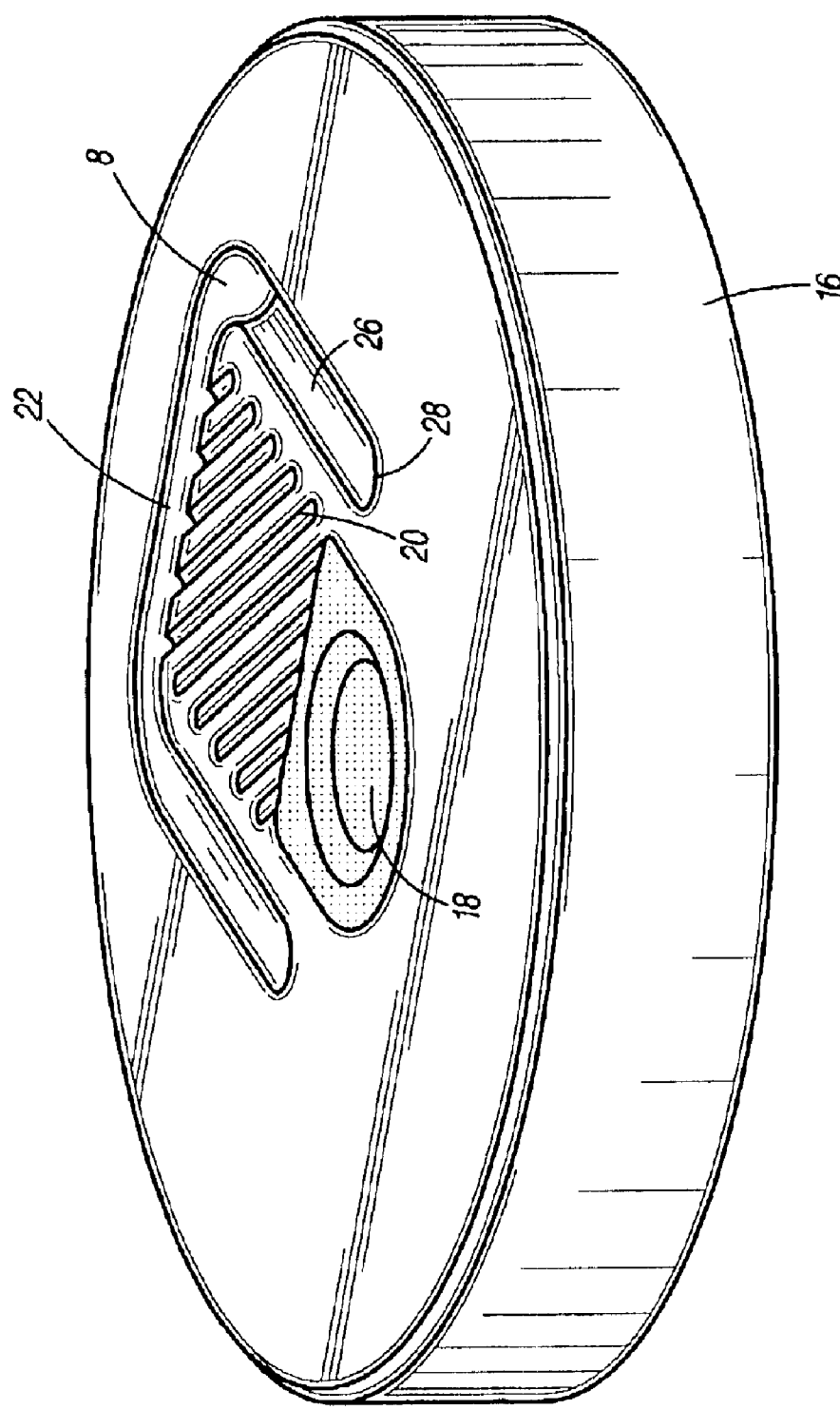
FIG. 3 is a perspective view of the bottom plate.

The plates comprising the lattice gate 4 are illustrated in FIGS. 2 to 7. FIGS. 2 and 3 illustrate the bottom plate 16, also known as the gate plate. Offset from the center of the plate 16 is a distribution area 18. Adjacent to the distribution area 18 is a plurality of flow channels 20. At the opposing end of the flow channels 20 is a U-shaped outlet distribution channel 8. The U-shaped outlet distribution channel 8 has a central portion 22 coincident with the ends of the flow channels 20. At the terminal ends 24 of the side portions 26 of the outlet distribution channel 8 are ports 28 to the drop gate runners 10.

Figure 4:
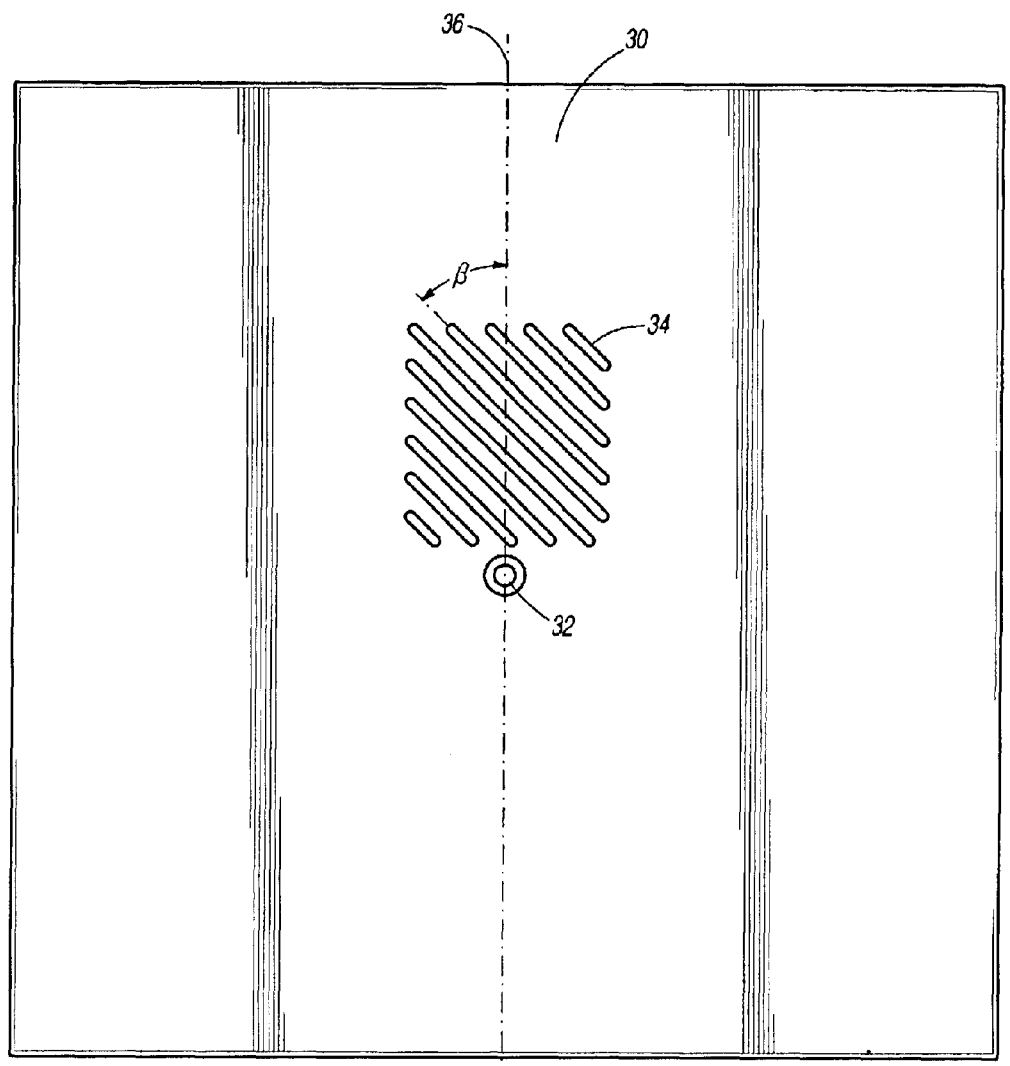
FIG. 4 is an overhead view of the top plate of the lattice portion of the hybrid gate system.

The top plate 30, also known as the sprue plate, is illustrated in FIG. 4. Centrally located in the top plate 30 is the sprue bore 32. Adjacent to the sprue bore 32 is a plurality of flow channels 34.

When the flow channels 20, 34 of the top and bottom plates 16, 30 are formed into the respective plates 16, 30, as seen from overhead, the inclination direction of the channels 20, 34 is identical. The plurality of flow channels 20, 34 formed in the plates 16, 30 are parallel to each other and inclined at angles β of about 30° to about 70°, preferably at angles of about 45° to about 60°, with respect to a centerline 36. As the angle β of the parallel flow channels 16, 30 increases with respect to the centerline 36 of each plate 16, 30, the time required for any elastomeric compound to flow through the channels 20, 34 also increases, and vice versa. The flow channels 20, 34 are illustrated with a semi-circular cross-section; however, it is within this invention to form the flow channels 20, 34 with other cross-sections, such as elliptical, triangular, or square as desired.

Figure 5:
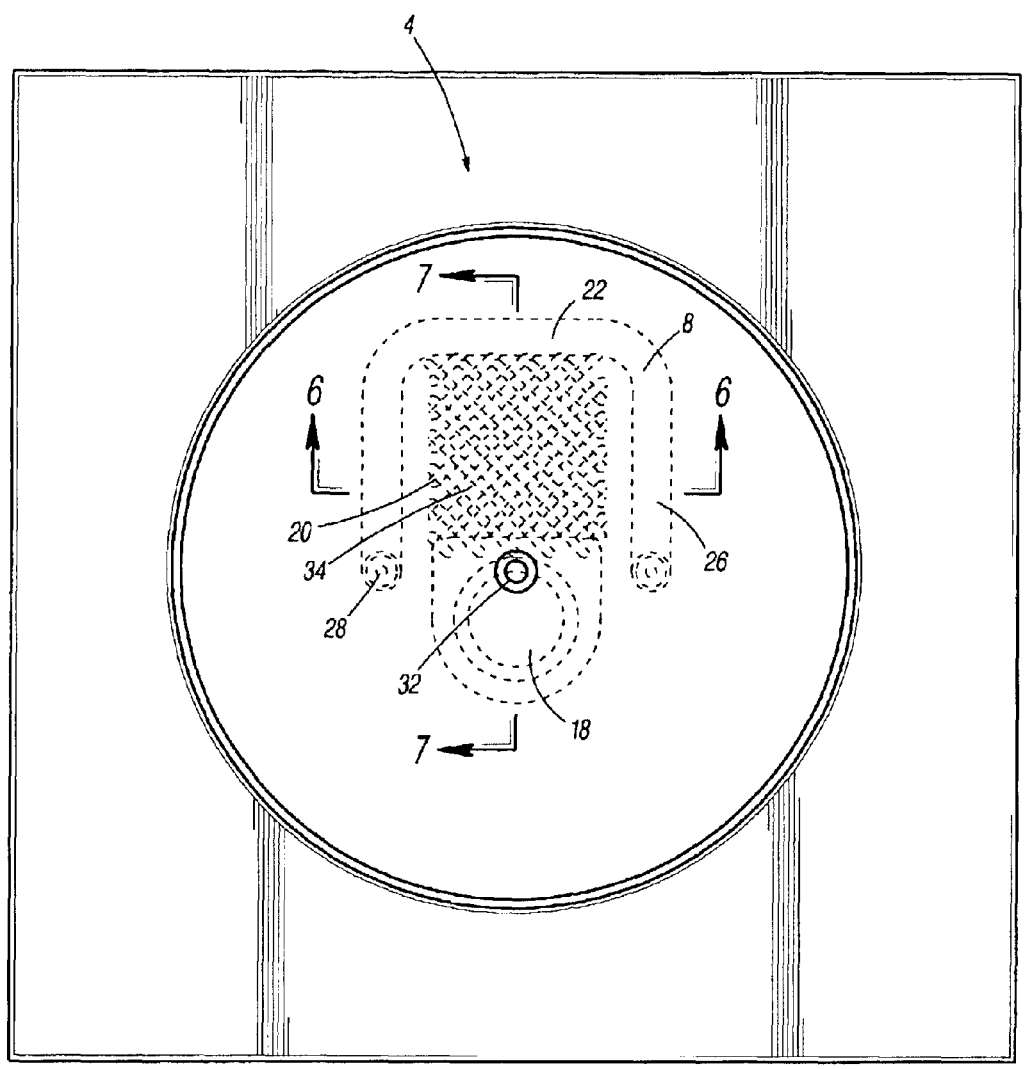
FIG. 5 is the gate after the top and bottom plates have been assembled.
Figure 6:
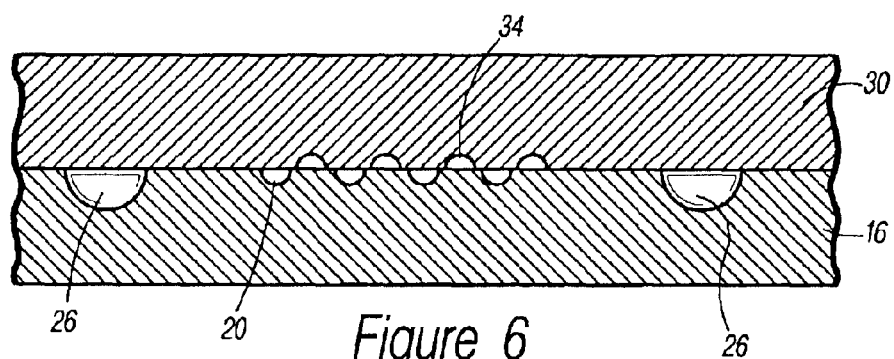
FIGS. 6 and 7 are section views of the gate along lines 6—6 and 7—7 of FIG. 5, respectively.
Figure 7:
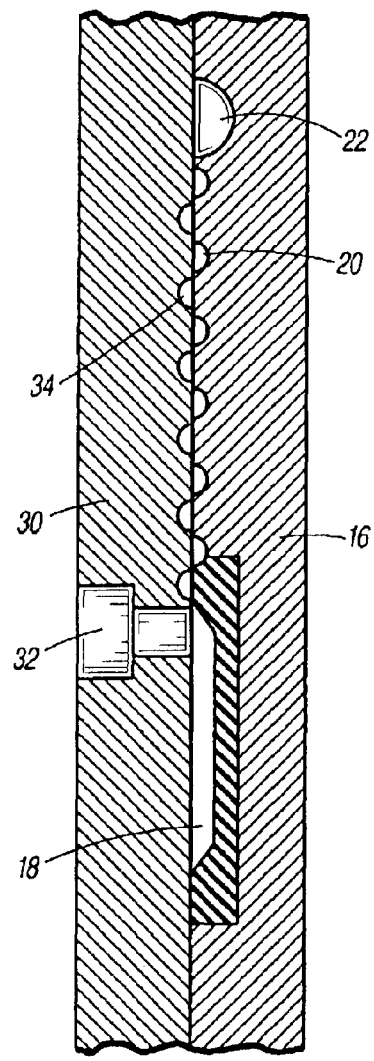

FIGS. 5, 6, and 7 illustrate the lattice gate 4 after the top and bottom plates 16, 30 have been assembled. The sprue inlet bore 32 of the top plate 30 is aligned along a same axis with the drop gate ports 28, while being offset from the center of the distribution area 18 of the bottom plate 16. Also, the plurality of flow channels 20, 34 are coincident with the edge of the distribution area 18 at one end, while the opposing end of the flow channels 20, 34 are coincident with the central portion 22 of the outlet distribution channel 8. As the elastomeric compound flows into the lattice gate 4 through the sprue bore 32, the compound fills the distribution area 18 due to the injection pressure. The compound then flows into the cross directional flow channels 20, 34, exiting the flow channels 20, 34 into the central portion 22 of the outlet distribution channel 8. The injection pressure of the elastomer forces the compound to then flow through the side portions 26 of the outlet distribution channel 8 and through the drop gate runner ports 28.

For the illustrated lattice gate configuration, spacing must be maintained between the flow channels 20, 34 and the side portions 26 of the outlet distribution channel 8. If this spacing is insufficient, the elastomeric compound may not travel completely through the lattice gate 4, but it may enter the distribution channel 8 prior to complete mixing of the compound through the flow channels 20, 34. This spacing can be seen in FIG. 6.

Figure 8:
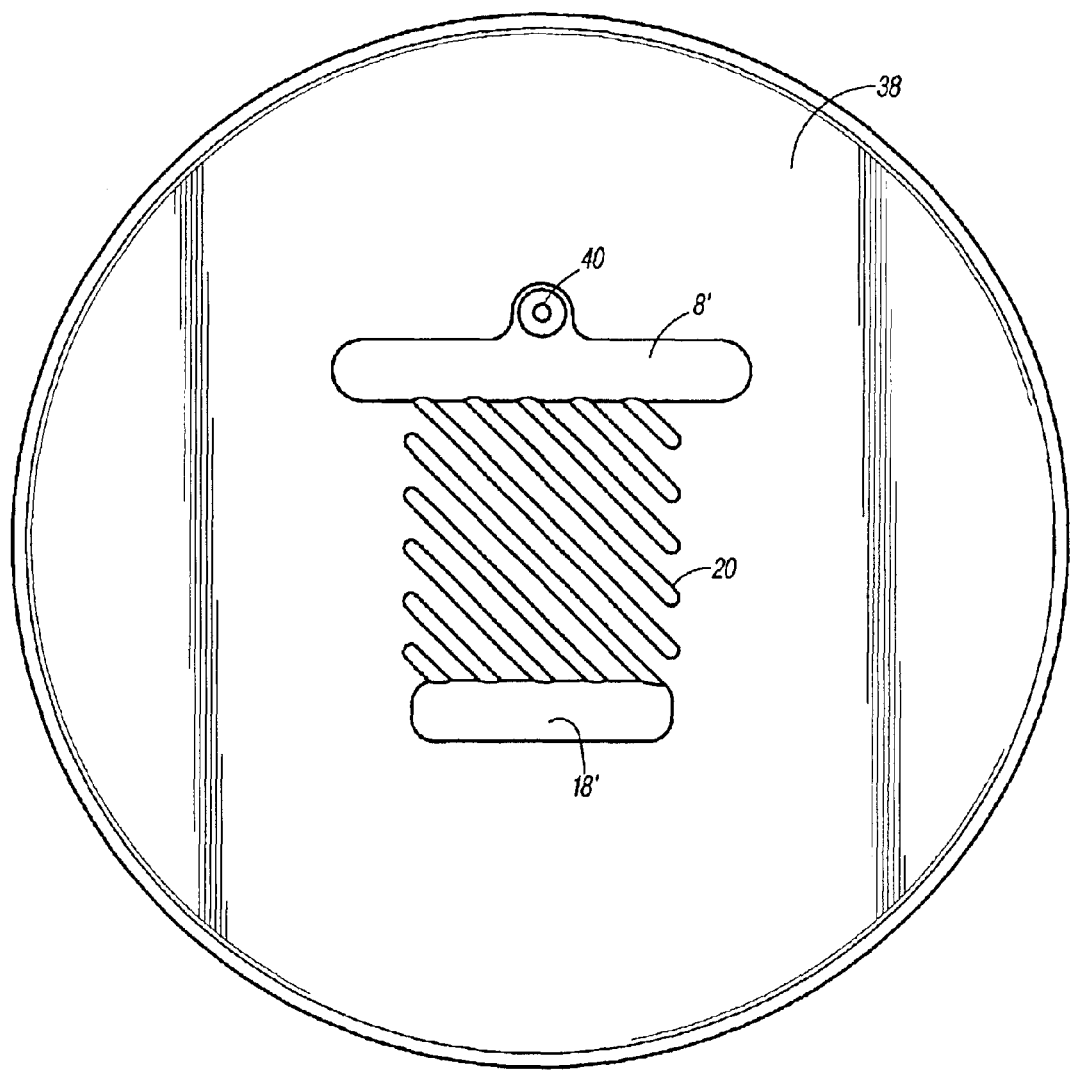
FIG. 8 is another embodiment of the bottom plate.

In the illustrated lattice gate configuration, the distribution area 18 has a predominantly circular configuration and depth greater than the flow channels 20, 34 so that the injection pressure may be used to exert pressure on an essential component about which the elastomeric compound is to be molded; e.g. a central steel tube in a molded motor mount. The illustrated distribution area 18 is specific to a particular application. The shape of the distribution area 18 is designed to meet the needs of each specific molding application. For example, the distribution area 18 of a bottom plate 38 may be configured as a single portion flow channel 18' connecting the sprue bore of the top plate to the flow channels 20, 34; such a variation is illustrated in FIG. 8.

Additionally, the outlet distribution channel 8 may have a configuration other than a U-shape. A U-shape outlet distribution channel addresses the need to have two spaced drop gate ports 28 feeding two drop gate runners 10. If the specific molding application or injection machine permits, the outlet distribution channel 8 may have another configuration, such as a straight line flow channel 8' with a central drop gate port 40, as illustrated in FIG. 8.

Figure 9:
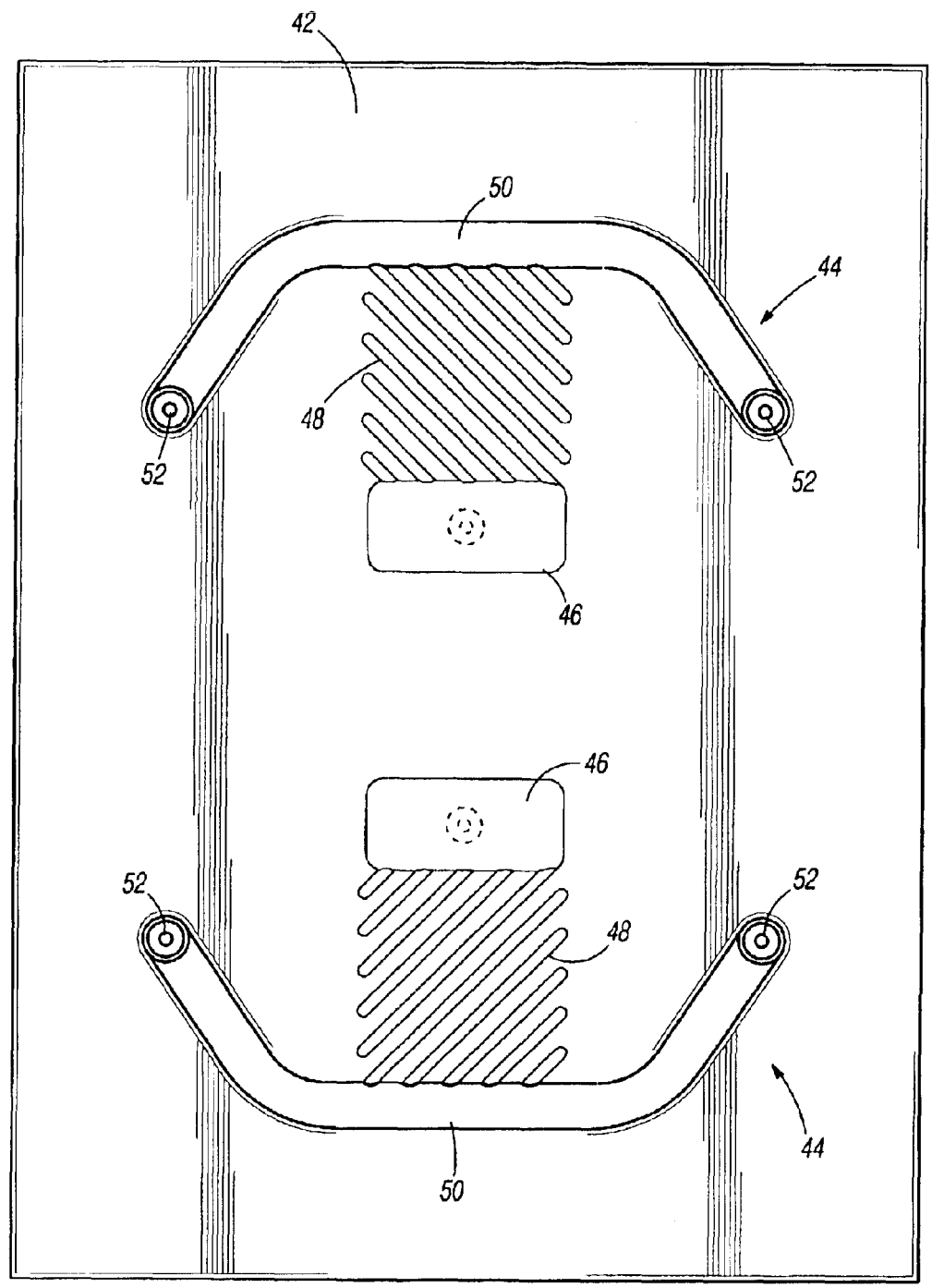
FIG. 9 is another embodiment of the bottom plate.

If the production of the molded article requires more than the illustrated two drop gate runners 10, the shape of the outlet distribution channel 8 may be further modified to accommodate more drop gate orifices. Another alternative for an injection molding apparatus employing plural drop gate runners 10 is to form the top and bottom plates with multiple sprue inlets and lattice gate portions FIG. 9 illustrates a configuration that may be employed for the bottom plate 42. The hybrid injection gate 2 has two separate lattice gates 44. Each lattice gate has a distribution area 46, flow channels 48, a distribution channel 50, and drop gate ports 52. Such a hybrid gate 2 permits the use of four drop gate runners 10 to feed to mold cavity 14.

The use of the lattice gate in combination with the drop gate, i.e. the inventive hybrid gate 2, results in a faster cycle time for molding articles compared to the conventional drop gate system 100. This is illustrated in the comparison tests set forth below.

Comparative Cure Time Tests

Figure 10:
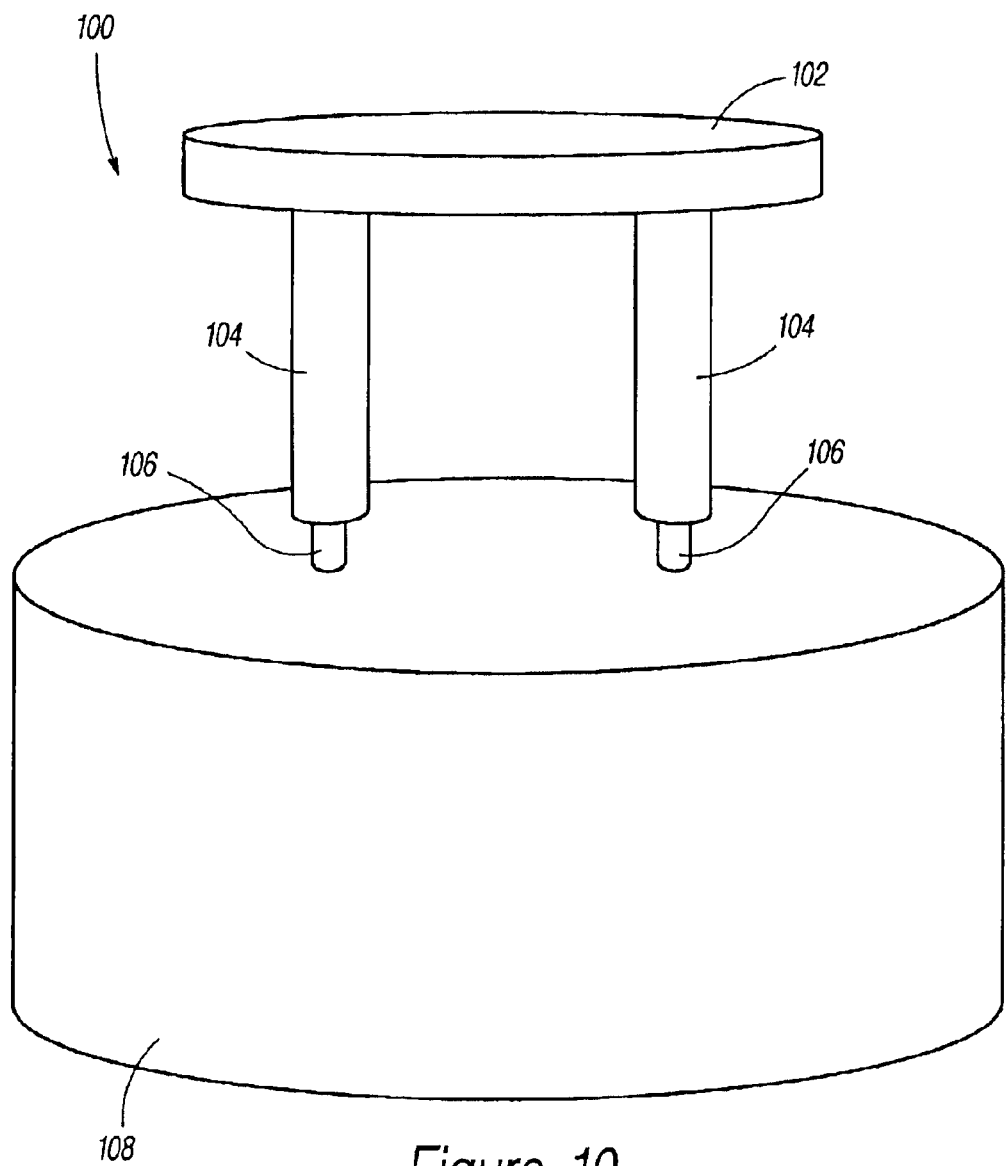
FIG. 10 is schematic representation of a conventional drop gate design used to mold an article.

A 40-ton vertical injection molder was used for the test. The mold employed was a production engine mount mold with exchangeable top plates. The first set of top plates had a drop gate design delivery system only (schematically illustrated in FIG. 10). The second set of top plates had the lattice gate followed by an identical drop gate delivery system (schematically illustrated in FIG. 1). The drop gate design delivery system had a 0.229 cm (0.090") injection orifice. The lattice gate had a structure of 45/5/0.099 cm/3.175 cm (channel angle/number of channels/channel radius/length) (45/5/ 0.039"/1.25"), and had a construction similar to the lattice gate 4 illustrated in FIG. 5. For all of the runs, the mold temperature was 154° to 163° C. (310° to 325° F.), depending upon the location within the mold. The rubber temperature at the time of injection was 127° to 130° C. (260° to 265° F.). The top plates with the lattice gate design were not treated with any release coatings.

Engine mount bushings were injected on the 40-ton injector using bushing metals without adhesive to permit easy removal of the metal insert from the molded rubber. To determine the extent of cure, the rubber was cut open at the point of least cure. The size of the uncured region at the point of least cure gives a relative state of cure. The bushing was considered sufficiently cured if there was no sign of uncured or doughy rubber. While many of the parts that had uncured rubber inside immediately after injection would eventually have cured completely from the latent heat within the bushing, the intent of the comparative tests was to establish a baseline for comparison of the two gate designs. Thus, all comparisons were done by cutting the part open immediately after removal from the mold.

The minimum cure time for each type of gate was determined by reducing the cure time in successive steps until such time at which uncured regions were seen in the parts. The same elastomeric compound was used for all the trials. The compound used was a standard commercial product.

| Part No. | Gate Type | Injection time (seconds) | Cure Time (seconds) | Total Cycle time | Completely Cured? | Comments |
|---|---|---|---|---|---|---|
| | | | Comparison Cure Times | | | |
| 1 | Hybrid | 18 | 270 | 298 | Yes | Fully cured |
| 2 | Hybrid | 18 | 240 | 258 | Yes | Fully cured |
| 3 | Hybrid | 18 | 180 | 198 | Yes | Fully cured |
| 4 | Hybrid | 18 | 120 | 138 | Yes | Fully cured |
| 5 | Hybrid | 18 | 60 | 78 | No | Part looks fully cured, point of least cure occurring at center metal insert |
| 6 | drop | 5 | 360 | 365 | Yes | ~½"–¾" D glossy spot but no dough |
| 7 | drop | 6 | 300 | 306 | No | Process conditioning part, but had ~1" x ¾" uncured area |

Observations from Trials

In Part No. 5, the bushing was almost completely cured at 60 seconds, but rubber porosity occurred at the interface between the smaller metal insert and the rubber. The metal insert acted as a heat sink, cooling the rubber at its surface and slowing the cure rate. A conservative estimate for Part No. 5's minimum cure time can be estimated at 90 seconds, this being extrapolated from the 60 second and 120 second cure times although the actual minimum cure time could be closer to 60 seconds.

In Part Nos. 1 to 5, there was no significant flashing, i.e., all of the rubber traveled through the injection gate prior to entry through the drop gate runner orifice.

It was noted that for Part Nos 1 to 5 the injection time may be reduced by the use of release coatings on the lattice gate plates.

The use of the lattice gate in combination with the drop gate reduced the part cure time from 360 seconds to 90 seconds (see above discussion), the total cycle time for the part from 365 to 108 seconds. This is a 75% reduction in cure time and a reduction of over 70% in the total cycle time. Even if the minimum cure time for Part No. 5 is not extrapolated out to 90 seconds and the cure time of Part No. 4 is used instead to determine the cure time improvement, the cure time for Part No. 4 is reduced by 66%, and total cycle time is reduced by over 60%.

As discussed previously, the majority of rubber shear heating occurs at the orifice area of the gate. By incorporating a lattice gate prior to the drop gate, the hybrid injection gate is more efficient in heating the rubber prior to the rubber entering the mold cavity. This can be clearly seen by the substantially reduced cure times of the trial runs.

Using the hybrid concept permits the incorporation of the lattice gate into the gate design where the known plane of entry lattice gate design alone could not be used. The flow from the lattice gate is instead channeled through outlet distribution channels acting as mold runners to move the rubber to the drop gate and into the mold cavity.

The present invention of incorporation of a lattice gate with a drop gate is capable of reducing cure times required to mold parts. Such reduced cure times are especially beneficial for molded parts with very thick cross-sections.

The mixing of the molding compound as it flows through the channeled entry lattice gate also improves the mixing and temperature uniformity of the molding compound prior to entry of the compound into the mold.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications, and variations as fall within the spirit and scope of the appended claims.

What is claimed is:

1. A drop injection gate for injection molding rubber into a mold cavity, the gate being formed of a top plate and a bottom plate, the gate comprising drop gate runners, the gate being characterized by:
    the gate having a region adjacent to the drop gate runners, the region comprising a plurality of spaced single direction flow channels in both the top and bottom plates, such that when the top and bottom plates are assembled to form the gate, in the region, the single direction flow channels are disposed at intersecting angles to each other to create cross direction flow of the rubber before the rubber enters into the drop gate runners.

2. A drop injection gate in accordance with claim 1 wherein the drop injection gate is further characterized by more than one separate region adjacent to the drop gate runners comprising the plurality of spaced single direction flow channels that are disposed at intersecting angles to each other when the gate is assembled.

3. A drop injection gate in accordance with claim 1 wherein the plurality of spaced single direction flow channels are inclined at angles of about 30° to 70° relative to a gate centerline.

4. A drop injection gate in accordance with claim 1 wherein the spaced single direction flow channels have a cross-sectional configuration of semi-circular, elliptical, triangular or square.

5. A drop injection gate in accordance with claim 1 wherein the gate further comprises a distribution channel adjacent the region.

* * * * *